United States Patent
Kumagai et al.

(10) Patent No.: US 7,072,032 B2
(45) Date of Patent: Jul. 4, 2006

(54) AUTOMATIC TRACKING APPARATUS FOR REFLECTOR

(75) Inventors: Kaoru Kumagai, Tokyo (JP); Masahiro Saito, Tokyo (JP); Shinji Yamaguchi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 203 days.

(21) Appl. No.: 10/718,230

(22) Filed: Nov. 20, 2003

(65) Prior Publication Data
US 2004/0100628 A1 May 27, 2004

(30) Foreign Application Priority Data
Nov. 22, 2002 (JP) .............................. 2002-339347

(51) Int. Cl.
*G01B 11/26* (2006.01)
*G01C /01* (2006.01)
(52) U.S. Cl. .............................. 356/139.08; 356/141.1; 356/4.01; 356/5.01
(58) Field of Classification Search ............... 356/3.01, 356/8, 300, 121, 122, 125, 622, 139.08, 4.03, 356/28, 28.5; 56/634
See application file for complete search history.

(56) References Cited

U.S. PATENT DOCUMENTS

| | | | | |
|---|---|---|---|---|
| 3,652,164 A | * | 3/1972 | Faramarzpour et al. | 356/125 |
| 3,730,629 A | * | 5/1973 | Rentzepis | 356/300 |
| 3,768,910 A | * | 10/1973 | Zanoni | 356/624 |
| 4,150,285 A | * | 4/1979 | Brienza et al. | 356/622 |
| 4,713,533 A | * | 12/1987 | Bremer et al. | 250/203.1 |
| 4,977,550 A | * | 12/1990 | Furuya et al. | 369/30.23 |
| 5,589,939 A | * | 12/1996 | Kitajima | 356/622 |
| 5,600,123 A | * | 2/1997 | Purrazzella | 250/203.3 |
| 5,696,859 A | * | 12/1997 | Onaka et al. | 385/24 |
| 6,526,107 B1 | * | 2/2003 | Katoh et al. | 375/368 |
| 6,552,782 B1 | * | 4/2003 | Colbourne et al. | 356/124 |
| 6,587,948 B1 | * | 7/2003 | Inazawa et al. | 713/193 |
| 6,671,002 B1 | * | 12/2003 | Konishi et al. | 348/725 |

FOREIGN PATENT DOCUMENTS

JP 05-322569 12/1993

* cited by examiner

*Primary Examiner*—Thomas H. Tarcza
*Assistant Examiner*—Luke D. Ratcliffe
(74) *Attorney, Agent, or Firm*—Chapman and Cutler LLP

(57) ABSTRACT

The present invention comprises an illumination portion (11), a light receiving portion (12), disposed in the surveying machine body (8), having an image sensor (27) for receiving a reflection light image (MO) of the measurement light, arithmetic means (38) for calculating a position in an area of the image sensor (27) for the reflection light image (MO) from a reflector (2), and a rotation mechanism for rotating the surveying machine body (8) so as to position the reflector (2) on a light receiving optical axis of the light receiving portion (12) based on the position obtained by the arithmetic means (38), and the light receiving portion (12) is provided with a light receiving sensor (47) having a smaller area than the area of the image sensor (27) on the light receiving optical axis in a conjugated position with the image area (27), and the arithmetic means (38) distinguishes the reflector 2 based on an output of the light receiving sensor (47).

3 Claims, 8 Drawing Sheets

AUTOMATIC TRACKING APPARATUS FOR REFLECTOR

FIELD OF THE INVENTION

The present invention relates to an automatic tracking apparatus for a reflector which illuminates measurement light toward a reflector, and seeks an arrival direction of the measurement light reflected on the reflector, and then tracks the reflector automatically.

DESCRIPTION OF THE RELATED ART

Conventionally, an automatic tracking apparatus for a reflector which comprises an eyepiece portion for collimating a corner cube as a reflector and a range finding portion for measuring a distance to the reflector, and scans the reflector in horizontal and vertical directions so as to tracks the reflector automatically by a surveying machine body has been well known. (For example, Japanese Patent Laid Open H05-322569)

Recently, at the request of lowering a price, there has been developed an automatic tracking apparatus for a reflector in which an illumination portion for illuminating measurement light toward a reflector and a light receiving portion having an image sensor such as a CCD for receiving a reflection light image of the measurement light illuminated toward the reflector are provided in a surveying machine body.

However, in this type of automatic tracking apparatus, light images from a head light of car and sunlight reflected on glasses other than he reflection light image from the reflector may be received in the image sensor, and it is hard for them to be distinguished from the reflection light image from the reflector because both of the light images are round, and then if a noise of light image other than the reflection light image is entered into the image sensor by a periphery environment, tracking of the reflector is disturbed.

SUMMARY OF THE INVENTION

The present invention has been made in view of aforementioned problem, it is, therefore, an object of the present invention to provide an automatic tracking apparatus for a reflector even thought an illumination portion for illuminating a measurement light toward a reflector and a light receiving portion having an image sensor for receiving a reflection light image of the measurement light illuminated toward the reflector are provided in a surveying machine body, the automatic tacking apparatus can carried out tracking without being disturbed.

According to a first aspect of the present invention, an automatic tracing apparatus for a reflector comprises a surveying machine body, an illumination portion disposed in the surveying machine body for illuminating a measurement light toward a reflector, a light receiving portion which is disposed in the surveying machine body which has an image sensor for receiving a reflection light image of the measurement light illuminated toward the reflector, arithmetic means for calculating a position of the reflection light image from the reflector in an area of the image sensor, and a rotation mechanism for rotating the surveying machine body so as to position the reflector on a light receiving optical axis of the light receiving portion based on the position obtained by the arithmetic means, and the light receiving portion is provided with an photosensitive device having a smaller area than the area of the image sensor on the light receiving optical axis and also in a conjugated position with the image sensor, and the arithmetic means distinguishes the reflector based on an output of the photosensitive device.

According to a second aspect of the present invention, in the automatic tracking apparatus for the reflector, the illumination portion outputs a modulation pulse, and the light receiving portion is provided with a synchronization detecting circuit for synchronously detecting the output of the photosensitive device based on the modulation pulse.

DESCRIPTION OF THE PREFERED EMBODIMENTS

Embodiment 1

Figure 1:
FIG. 1 is a side view showing a setting condition of an automatic tracking apparatus for a reflector according to the present invention.

In FIG. 1, reference numeral 1 denotes a surveying pedestal and reference numeral 2 a corner cube as a reflector placed at a point to be measured. This surveying pedestal 1 is provided with a surveying machine 3. This surveying machine 3 comprises a fixing board 4 and. a horizontal rotation portion 5. The fixing board 4 is provided with a known rotation mechanism (not shown) for rotating the horizontal rotation portion 5.

Figure 2:
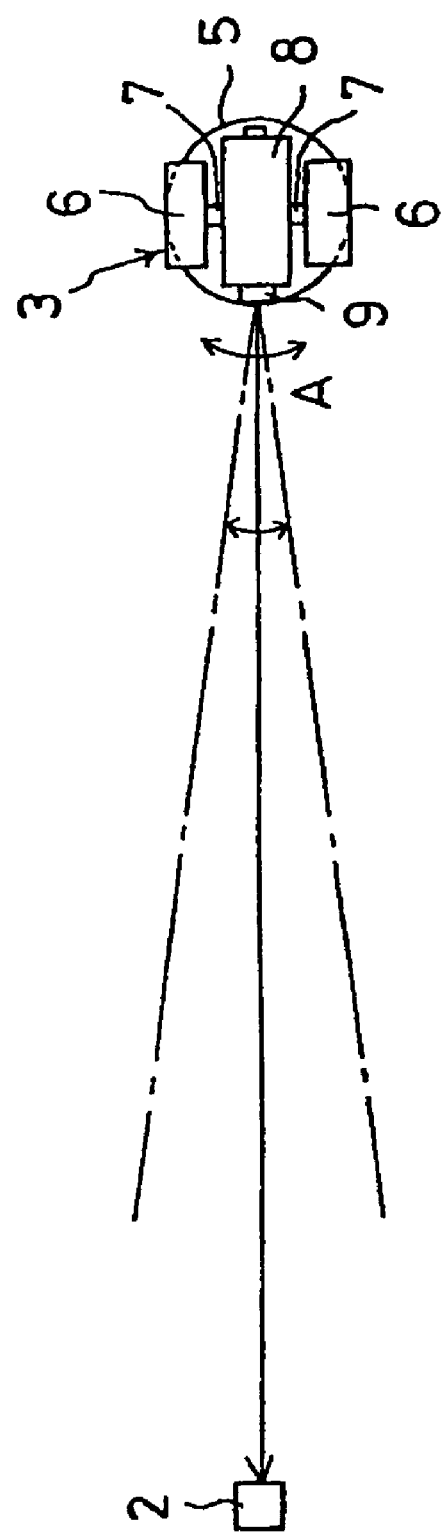
FIG. 2 is a plan view showing a setting condition of an automatic tracking apparatus for a reflector according to the present invention.

As shown in FIG. 2, the horizontal rotation portion 5 is rotated in the direction of arrow A relative to the fixing board 4. The horizontal rotation portion 5 comprises a supporting portion or carrying portion 6. A vertical direction rotation shaft 7 is mounted on the supporting portion 6, and a known rotation mechanism (not shown) for rotating the vertical direction rotation shaft 7 is provided in the inside of the supporting portion 6. A surveying machine body 8 is mounted on the vertical direction rotation shaft 7. The surveying machine body 8 is rotated in the horizontal direction by a rotation of the horizontal rotation portion 5, and also is rotated in the vertical direction by a rotation of the vertical direction rotation shaft 7 shown by the arrow B in FIG. 1.

Figure 3:
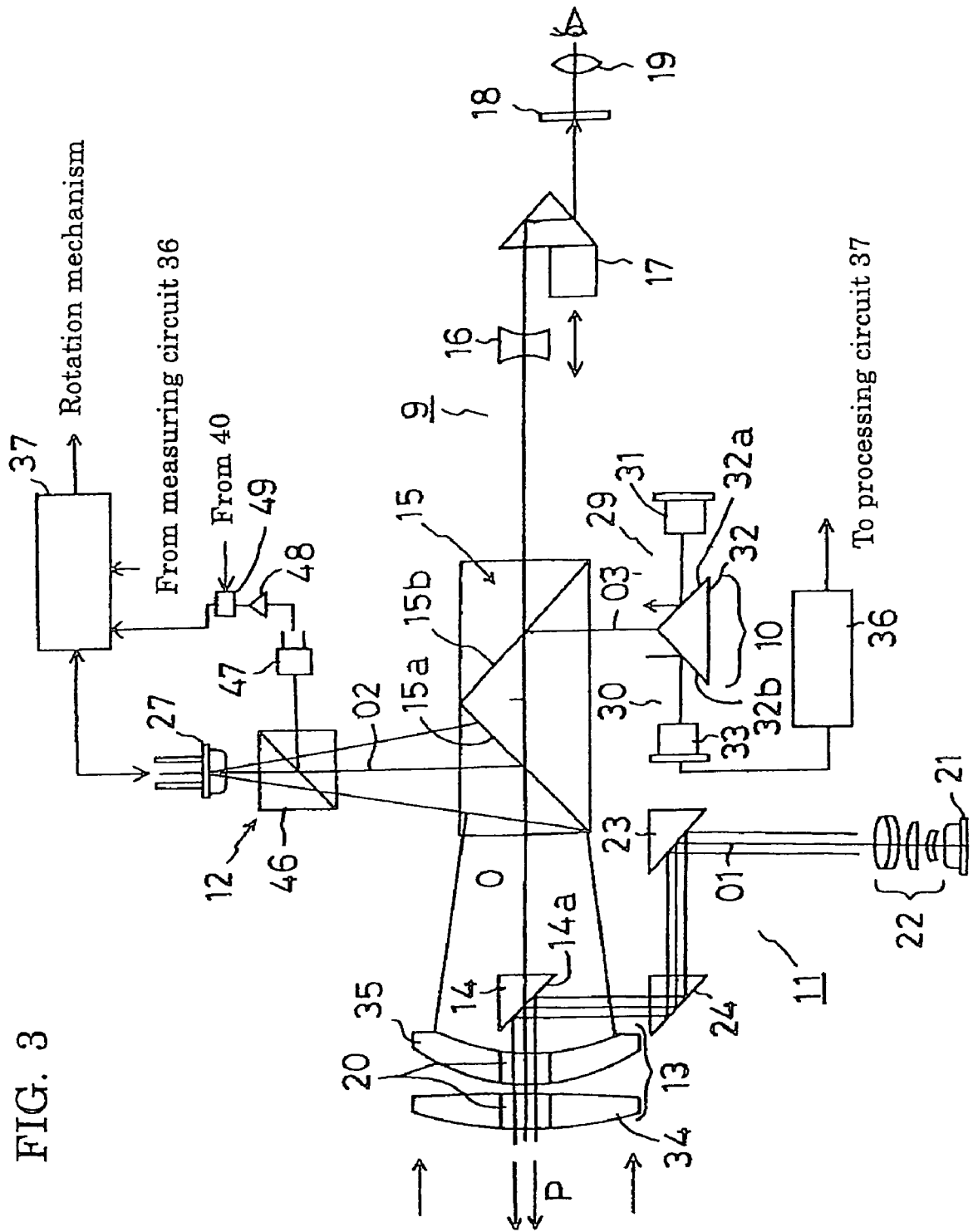
FIG. 3 is an explanation view showing an optical portion of an automatic tracking apparatus for a reflector according to the present invention.

In the surveying machine body 8, as shown in FIG. 3, there are provided with a collimation optical portion 9, a range finding optical portion 10, an illumination portion 11, and a light receiving portion 12. The collimation optical portion 9 is one for collimating the corner cube 2, and comprises an objective lens 13, a reflection mirror 14, a dichroic prism 15, a focusing lens 16, a Porro prism 17, a focal point mirror 18, and an eyepiece 19.

The objective lens 13 includes a penetration part 20. The reflection mirror 14 constructs part of the illumination portion 11. The illumination portion 11 comprises a laser diode 21, a collimator lens 22, and reflection mirrors 23, 24. The laser diode 21 ejaculates an infrared laser beam P (900 nm of wave length) as a measurement light, and the infrared laser beam P is changed to a parallel pencil by the collimator lens 22.

Figure 4:
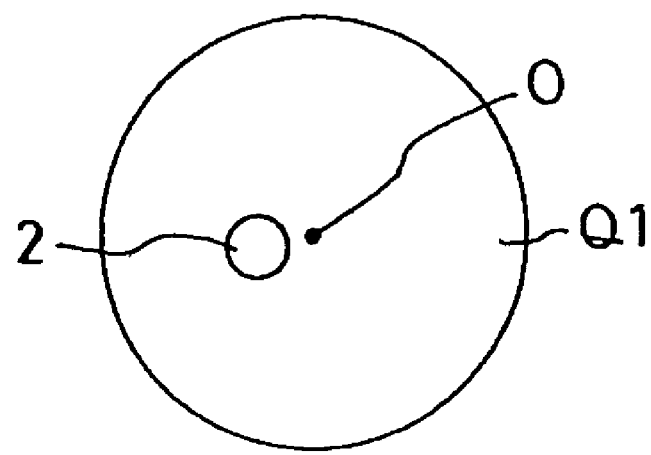
FIG. 4 is a view showing an example of an illumination area of measurement light by an illumination portion according to the present invention.

The reflection mirror 14 is for bringing an optical axis O1 of the illumination portion 11 into line with an optical axis O, and has a reflection face 14a. The infrared laser beam P is reflected on the reflection mirrors 23, 24, and is led to the objective lens 13, and then is emitted to an outside through the penetration portion 20, and is illuminated toward the corner cube 2. FIG. 4 shows an illumination area Q1 of the infrared laser beam P.

The infrared laser beam P which is reflected on the corner cube 2 is condensed by the whole area of the objective lens 13, and is led to the dichroic prism 15. The dichroic prism 15 includes reflection faces 15a, 15b.

The reflection face 15a reflects the infrared laser beam P toward the light receiving portion 12. The light receiving portion 12 comprises an image sensor 27. An optical axis O2 of the light receiving portion 12 is coincided with the optical axis O of the objective lens 13.

The range finding portion 10 is composed of a light projecting system 29 and a light receiving system 30, and the light projecting system 29 includes a laser light source 31 and the light receiving system 30 includes a photosensitive device 33. A triangle prism 32 is disposed between the light projecting system 29 and the light receiving system 30. The laser light source 31 emits an infrared laser light wave as a distance measuring luminous flux. A wave length of its infrared laser light wave is 800 nm, and the wave length is different from the wave length of the infrared laser light P.

The infrared laser light wave is reflected on a reflection face 32a of the triangle prism 32, and is led to the reflection face 15b of the dichroic prism 15. This reflection face 15b transmits light of a visualized area, and reflects light of an infrared area including light with a wavelength of 800 nm.

The infrared laser light wave which is led to the reflection face 15b is emitted as a plane wave to the outside of the surveying machine body 8 by passing through a lower half area 34 of the objective lens 13 after transmitting the reflection face 15a. The infrared laser light wave is reflected on the corner cube 2, and returns to the objective lens 13, and is condensed by an upper half area 35 of the objective lens 13. After that, the infrared laser light wave is led to the reflection face 15b after transmitting the reflection face 15a of the dichroic prism 15, and then is led to a reflection face 32b of the triangle prism 32 by this reflection face 15b, and is reflected on this reflection face 32b, and then is converged on the photosensitive device 33.

An output of light receiving of the photosensitive device 33 is input in a known measuring circuit 36, and the measuring circuit 36 calculates a distance from the surveying machine body 8 to a corner cube 2. The distance from the surveying machine body to the corner cube 2 is thereby measured.

A luminous flux of a visualized area is led to the focal point mirror 18 through the objective lens 13, the dichroic prism 15, the focusing lens 16, and the Porro prism 17, and including a vicinity of the corner cube 2, an image of the vicinity is formed on the focal point mirror 18 by adjusting the focusing lens 16. A worker can collimate the corner cube 2 by looking into a visualized image, which is imaged on the focal point mirror 18 through the eyepiece 19.

Figure 5:
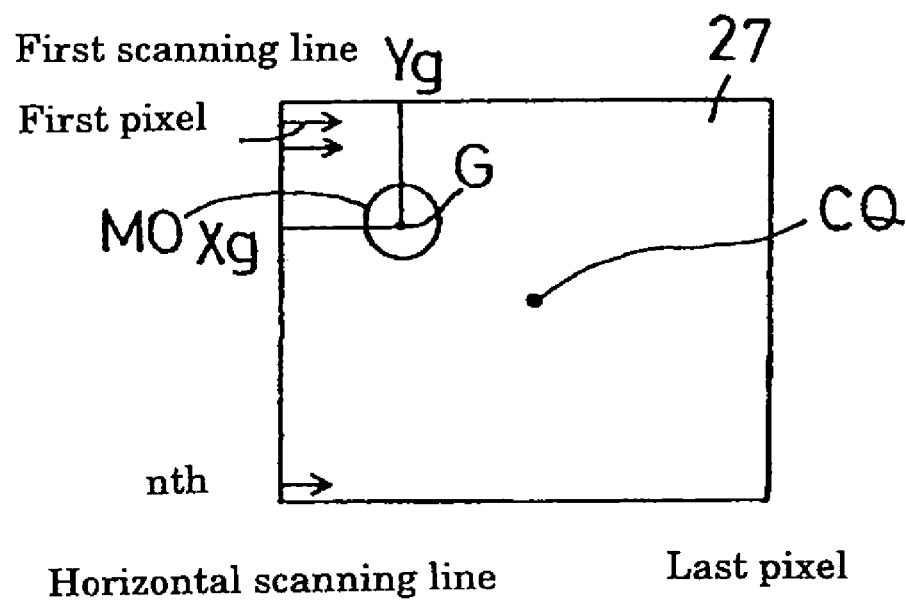
FIG. 5 is an explanation view showing an example of a reflection light image formed in an image sensor according to the present invention.
Figure 6:
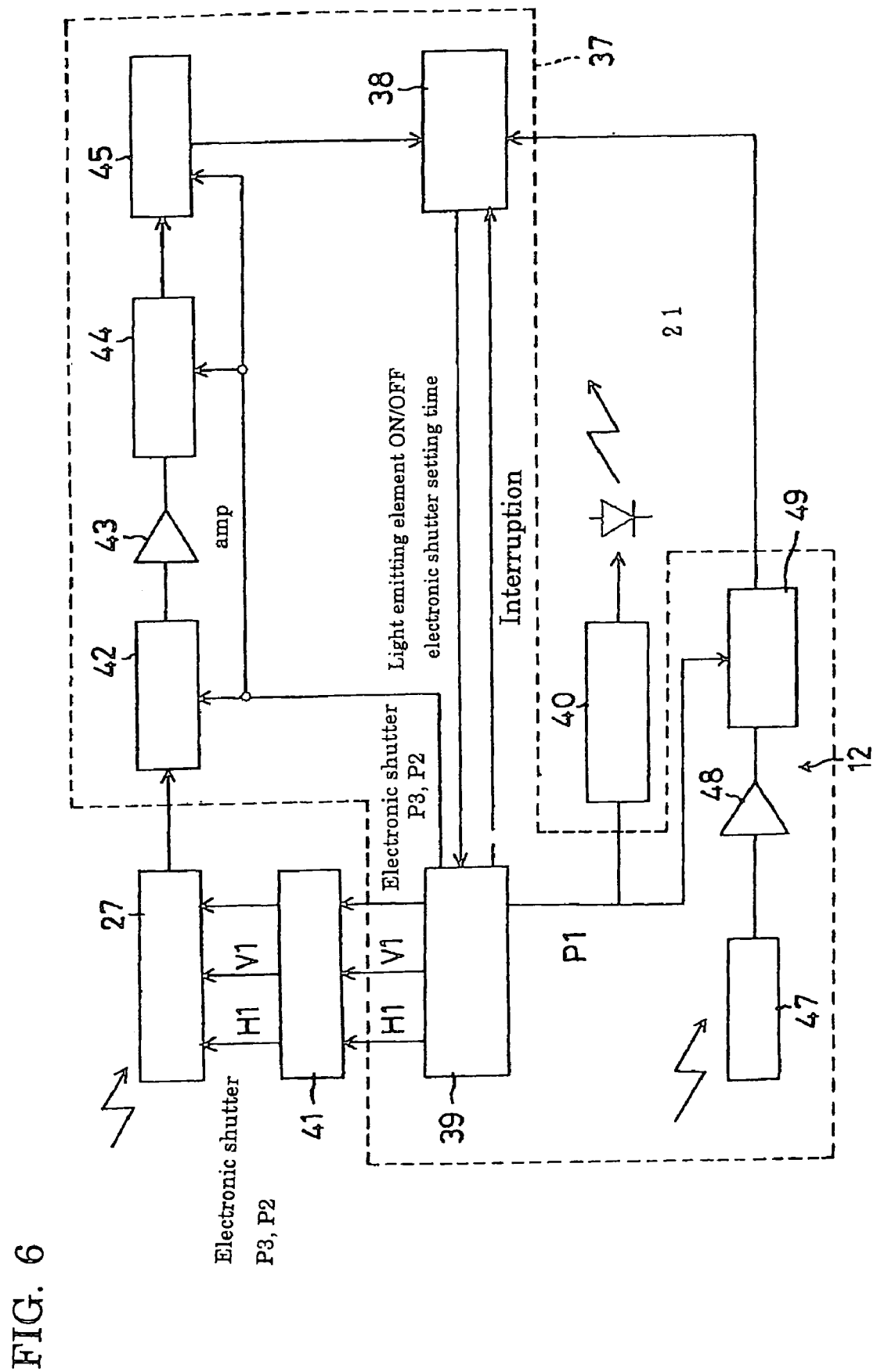
FIG. 6 is a circuit block diagram showing an example of a processing circuit according to the embodiment of the present invention.
Figure 7:
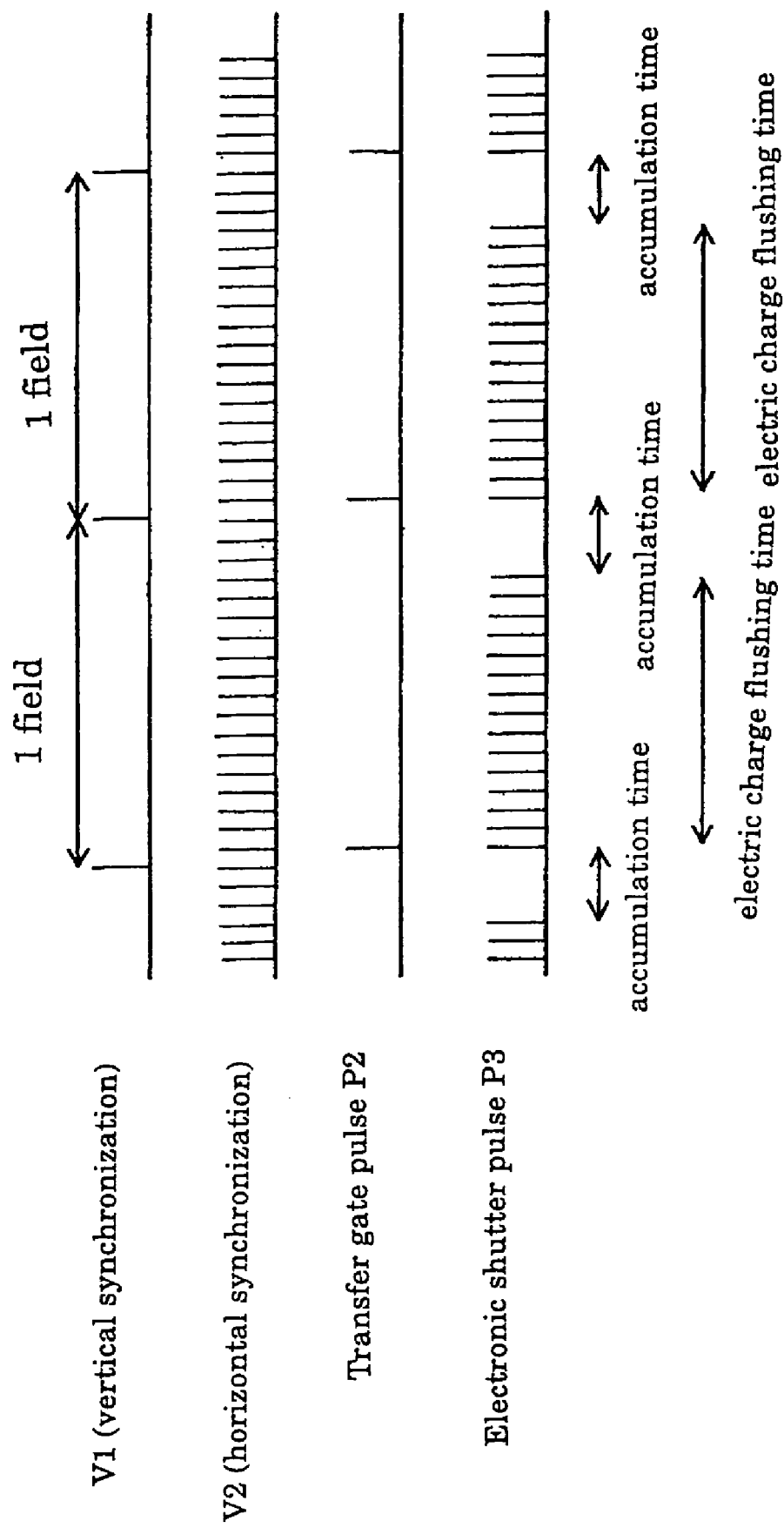
FIG. 7 is a timing chart explaining timing for taking a signal out from the image sensor according to the present invention.

As shown in FIG. 5, a reflection light image M0 by the reflection light of the measurement light from the corner cube 2 is formed in the area of the image sensor 27. An output of the image sensor 27 is input in a processing circuit 37 shown in FIG. 6. The processing circuit 37 comprises a central processing device 38 as arithmetic means and a circuit for generating a timing signal 39. The circuit for generating the timing signal 39 outputs a light emitting timing pulse signal P1 toward a laser diode driver circuit or a light emitting element driver circuit 40, and also outputs a vertical synchronization signal V1, a horizontal synchronization signal H1, a transfer gate pulse signal P2, and an electronic shutter pulse P3 as shown FIG. 7 toward a driver circuit 41.

Figure 8:
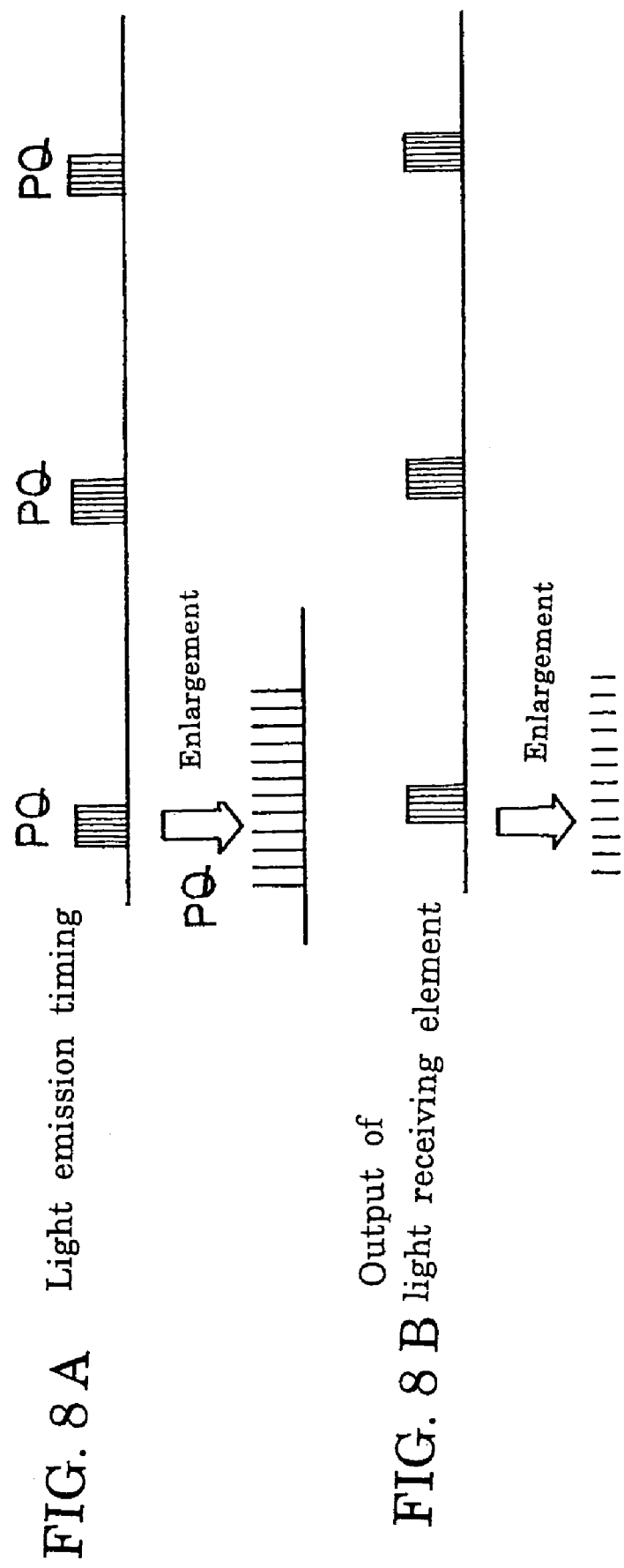
FIG. 8A is a timing chart graph explaining a relationship between the light emitting timing signal and the light receiving signal, and also a graph indicating the emitting light output.
FIG. 8B is a timing chart graph explaining a relationship between the light emitting timing signal and the light receiving signal, and also a graph indicating the light receiving output.

The light of the laser diode 21 is made to emit pulsed light by a signal from the light emitting element driver circuit 40 during an electronic shutter pulse P3 or an accumulation time is stopped within the period of one field. The frequency of the light emission pulse is modulated such as amplitude modulation. FIG. 8A indicates a light emission pulse train PQ modulated by the laser diode driver circuit 40.

The driver circuit 41 scans each pixel in the image sensor 27 based on the vertical synchronization signal V1, the horizontal synchronization signal H1, the transfer gate pulse signal P2, and the electronic shutter pulse P3. The scanning frequency is 1/60 Hz or 1/50 Hz at each filed.

The output signal (quantity of light signal or luminance signal) of each pixel is input in a sample hold circuit 42, and is input in an A/D conversion circuit 44 after being amplified by an amplification circuit 43. The A/D conversion circuit 44 outputs the quantity of light signal of each pixel as 8 bits data toward a flame memory 45 as a storing portion.

When measurement is conducted outside of a house, in order to reduce outside light as much as possible, it is desirable to adjust the quantity of light by adjusting a mechanical aperture stop (not shown), the gain of the amplification circuit 43, and the time of the electronic shutter pulse.

The central arithmetic processing device 38 reads out the quantity of light signal based on each pixel from the flame memory 45, and calculates positions of the center of gravity G (Xg, Yg), and based on the positions of the center of gravity G (Xg, Yg) obtained like this, the central arithmetic processing device 38 outputs a rotation control signal toward the rotation mechanism so as that the surveying machine body 8 turns to the corner cube 2. In other words, the central arithmetic processing device 38 rotates and controls the surveying machine body 8 so as that the positions of the center of gravity G of the reflection light image M0 is coincided with a center CQ of the image sensor 27.

The light receiving portion 12 is provided with a beam splitter 46 and a light receiving sensor 47. The light receiving sensor 47 and the image sensor 27 are disposed in a conjugated position through the beam splitter 46. The area of the light receiving sensor 47 is smaller than the area of the image sensor 27, and has a function for receiving the quantity of light in the vicinity area including the image center CQ.

An output of the light receiving of the light receiving sensor 47 is input in a synchronization detecting circuit 49 through an amplifier 48. The synchronization detecting circuit 49 synchronously detects the output of light receiving of the light receiving sensor 47 based on the modulation signal from the light emitting element driver 40. FIG. 8B indicates the output of the light receiving of the light receiving sensor 47. When a modulation frequency of the light emitting element deriver 40 and a frequency of the output of the light receiving from the light receiving sensor 47 are coincided, the synchronization detecting circuit 49 outputs the coincided signal toward the central processing device 38, and the central processing device 38 can judge whether or not an object existed on the optical axis O is the reflector, in other words, whether or not the light image acquired on the image center CQ in the image sensor 27 is the reflection light image form the reflector 2 can be judged.

Figure 9:
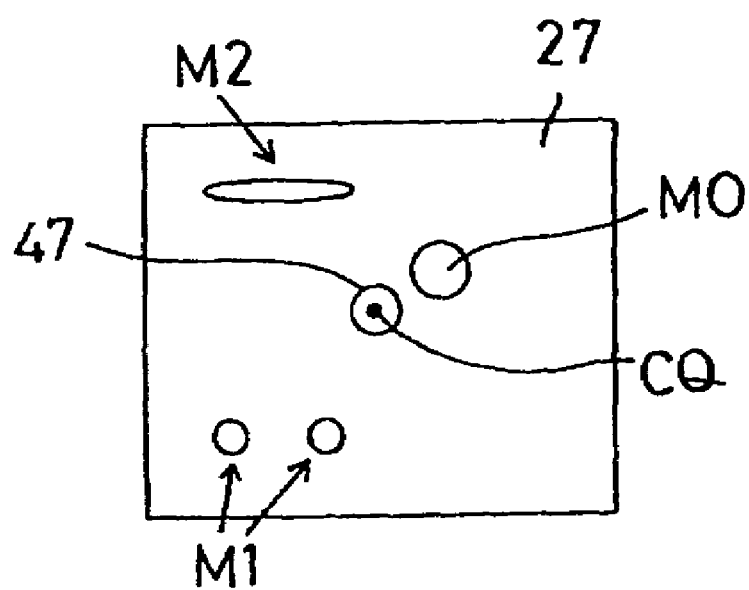
FIG. 9 is an explanation view showing an example of a light image reflected on the image sensor.

As shown in FIG. 9, for example, when the measurement is conducted an outside of a house, light images such as a light image M1 from a head light, a light image M2 from reflection light of sun, and the light image M0 form a reflector are appeared in the image sensor 27, however, the modulation is not applied to the light image M2 from the reflection light of sun and the light image M1 from the head light. Therefore, even thought these light images M1, M2 are positioned in the center CQ of the image sensor 27, it is possible to avoid that the reflection light image M0 from the reflector 2 is misjudged as these light images M1, M2.

Moreover, for example, there is a case that a head light is crossed the backside of the reflector 2, but in this case, only the reflector 2 can be securely tracked.

According to the present invention, an automatic tracking apparatus for a reflector even thought an illumination portion for illuminating measurement light toward a reflector and a light receiving portion having an image sensor for receiving a reflection light image of the measurement light illuminated toward the reflector are provided in a surveying machine body, the automatic tracking apparatus can carry out tracking without being disturbed.

In other words, according to the present invention, when a light image other than the reflection light image is existed in the vicinity of the center of the image sensor, the reflection light image from the reflector can be securely distinguished from the other light image and can be tracked.

This distinguish judgment can be carried out within every scanning period of one field of the image sensor, so the distinguish judgment is conducted almost in a real time; therefore, a tracking error can be further reduced.

What is claimed is:

1. An automatic tracking apparatus for a reflector comprising:
   a surveying machine body;
   an illumination portion, which is disposed in said surveying machine body, and illuminates a measurement light of a modulated measurement light toward a reflector;
   a light receiving portion, which is disposed in said surveying machine body, and has an image sensor for receiving a reflection light image of the measurement light illuminated toward said reflector;
   an arithmetic device configured to calculate a position of the reflection light image from said reflector in an area of said image sensor; and
   a rotation mechanism, which rotates said surveying machine body such that the position of the reflection light image obtained by said arithmetic device becomes a center of the image sensor,
   wherein said light receiving portion is provided with a light receiving sensor, which has a smaller area than the area of said image sensor, and is disposed in a conjugated position with the image sensor on a light receiving optical axis of the light receiving portion, so as to receive a quantity of light in a vicinity area including an image center of the image sensor, and a synchronization detecting circuit which detects an output of the light receiving sensor in synchronization with the modulated measurement light, and
   said arithmetic device determines the reflection light image from the reflector if the synchronization detecting circuit detects that a modulated frequency of the modulated measurement light coincides with a frequency of the output of the light receiving sensor, and rotates the rotation mechanism based on the determination to track the reflector.

2. The automatic tracking apparatus for a reflector according to claim 1, wherein said image sensor and said light receiving sensor are disposed in the conjugated position through a beam splitter.

3. The automatic tracking apparatus for a reflector according to claim 1, wherein said illumination portion emits a modulated pulsed light, which is the measurement light, in an accumulation time during one field of said image sensor, and the arithmetic device detects the position of the modulated pulsed light received by the image sensor, and distinguishes the reflection light image of the reflector from the light image other than the reflection light image of the reflector.

* * * * *